(12) United States Patent
Brick et al.

(10) Patent No.: US 8,757,849 B2
(45) Date of Patent: Jun. 24, 2014

(54) OPTICAL COMPONENT AND ILLUMINATION DEVICE

(75) Inventors: Peter Brick, Regensburg (DE); Julius Muschaweck, Gauting (DE); Simon Schwalenberg, Donaustauf (DE)

(73) Assignees: OSRAM Gesellschaft mit beschrankter Haftung, Munich (DE); OSRAM Opto Semiconductors GmbH, Regensburg (DE)

( * ) Notice: Subject to any disclaimer, the term of this patent is extended or adjusted under 35 U.S.C. 154(b) by 649 days.

(21) Appl. No.: 12/744,476

(22) PCT Filed: Nov. 19, 2008

(86) PCT No.: PCT/DE2008/001909
§ 371 (c)(1),
(2), (4) Date: Sep. 22, 2010

(87) PCT Pub. No.: WO2009/065389
PCT Pub. Date: May 28, 2009

(65) Prior Publication Data
US 2011/0188242 A1    Aug. 4, 2011

(30) Foreign Application Priority Data

Nov. 23, 2007  (DE) .......................... 10 2007 056 402

(51) Int. Cl.
*F21V 5/00*    (2006.01)
(52) U.S. Cl.
USPC ...................... 362/333; 362/326; 362/311.01
(58) Field of Classification Search
USPC .......... 362/311.01, 311.06, 311.15, 326, 330, 362/509, 521, 522, 217.04, 244, 332–340; 359/619, 621–624, 642, 707, 718, 721, 359/796–797
See application file for complete search history.

(56) References Cited

U.S. PATENT DOCUMENTS

| | | | | |
|---|---|---|---|---|
| 4,912,613 A | * | 3/1990 | Sanborn | 362/336 |
| 5,823,661 A | * | 10/1998 | Mahanay et al. | 362/293 |
| 6,317,263 B1 | | 11/2001 | Moshrefzadeh et al. | |
| 6,559,900 B1 | | 5/2003 | Kanamori et al. | |
| 6,599,002 B2 | * | 7/2003 | Hsieh et al. | 362/555 |
| 6,876,408 B2 | * | 4/2005 | Yamaguchi | 349/57 |
| 7,106,529 B2 | | 9/2006 | Gurevich et al. | |
| 7,236,304 B2 | * | 6/2007 | Okayama et al. | 359/626 |

(Continued)

FOREIGN PATENT DOCUMENTS

CN    1352761      6/2002
DE    10 2005 019 257    11/2006

(Continued)

*Primary Examiner* — Jong-Suk (James) Lee
*Assistant Examiner* — Bryon T Gyllstrom
(74) *Attorney, Agent, or Firm* — Cozen O'Connor

(57) ABSTRACT

An optical component comprises a carrier plate (1) having a first main surface (2) and a second main surface (3) facing away from the first main surface (2), and a first lens structure (4) on the first main surface (2), wherein the first lens structure (4) has at least a first lens element (41) having a first polygonal form and a second lens element (42) having a second polygonal form, the first lens structure (4) completely covers the first main surface (2), and the first lens element (41) and the second lens element (42) are non-congruent with respect to one another and/or differ in terms of their orientation on the first main surface (2) of the carrier plate (1).

15 Claims, 3 Drawing Sheets

(56) References Cited

U.S. PATENT DOCUMENTS

| | | | |
|---|---|---|---|
| 7,248,407 B2 * | 7/2007 | Kwon et al. | 359/455 |
| 7,441,927 B1 * | 10/2008 | Kling | 362/297 |
| 7,443,588 B2 | 10/2008 | Becker et al. | |
| 7,443,589 B2 * | 10/2008 | Erdmann et al. | 359/618 |
| 2002/0034710 A1 | 3/2002 | Morris et al. | |
| 2002/0093718 A1 | 7/2002 | Slack et al. | |
| 2003/0156266 A1 | 8/2003 | Tanitsu | |
| 2004/0008411 A1 | 1/2004 | Freese et al. | |
| 2004/0017612 A1 * | 1/2004 | Fadel et al. | 359/619 |
| 2005/0169008 A1 | 8/2005 | Okazaki | |
| 2006/0082887 A1 | 4/2006 | Po-Hung et al. | |
| 2006/0215401 A1 | 9/2006 | Menzel et al. | |
| 2006/0238876 A1 | 10/2006 | Erdmann et al. | |
| 2006/0285214 A1 * | 12/2006 | Haga et al. | 359/619 |
| 2009/0122175 A1 | 5/2009 | Yamagata | |

FOREIGN PATENT DOCUMENTS

| | | | | |
|---|---|---|---|---|
| DE | 10 2007 043 192 | 3/2009 | | |
| EP | 1 588 194 | 1/2004 | | |
| EP | 1517160 | 3/2005 | | |
| GB | 2 415 771 | 1/2006 | | |
| JP | 09-244021 | 9/1997 | | |
| JP | 2002-228840 | 8/2002 | | |
| JP | 2004-341107 | 12/2004 | | |
| JP | 2005-221516 | 8/2005 | | |
| JP | 2006-189676 | 7/2006 | | |
| JP | 2007-091119 | * 4/2007 | ............ | B60Q 3/02 |
| WO | WO 00/79341 | 12/2000 | | |
| WO | WO 02/10804 | 2/2002 | | |
| WO | WO 2006/101064 | 9/2006 | | |
| WO | WO 2009/033454 | 3/2009 | | |

* cited by examiner

OPTICAL COMPONENT AND ILLUMINATION DEVICE

RELATED APPLICATION

This is a U.S. National Phase Application under 35 USC §371 of International Application PCT/DE2008/001909 filed on Nov. 19, 2008.

This patent application claims the priority of German patent application no. 10 2007 056 402.5 filed Nov. 23, 2007, the disclosure content of which is hereby incorporated by reference.

FIELD OF THE INVENTION

The invention is related to an optical component and an illumination device comprising an optical component.

BACKGROUND OF THE INVENTION

Light sources that give an observer an inhomogeneous luminous impression in the form of an inhomogeneous luminance distribution or an inhomogeneous color distribution are often used for illumination purposes. In order to homogenize an inhomogeneous luminance distribution or color distribution, use is made of components which are disposed downstream of the light source and which completely or partly diffusely scatter the light from the light source by means of surface or volume scattering. However, the diffuse scattering is associated with losses in the emitted power and a deterioration of the etendue, that is to say the product of the emission area and the solid angle into which the light is emitted.

SUMMARY OF THE INVENTION

One object of the invention is to provide an optical component which can reduce or avoid the abovementioned disadvantages, and an illumination device comprising an optical element.

This and other objects are attained in accordance with one aspect of the present invention directed to an optical component that comprises,
  a carrier plate having a first main surface and a second main surface facing away from the first main surface, and
  a first lens structure on the first main surface, wherein
  the first lens structure has at least a first lens element having a first polygonal form and a second lens element having a second polygonal form,
  the first lens structure completely covers the first main surface, and
  the first lens element and the second lens element are non-congruent with respect to one another and/or differ in terms of their orientation on the first main surface of the carrier plate.

The fact that the first and the second lens elements have a polygonal form can mean here and hereinafter that the first lens element and the second lens element can each have a curved area bounded by a boundary line having the first and second polygonal form, respectively.

In particular, "polygonal" can mean here and hereinafter with regard to the first polygonal form and the second polygonal form that the first form and/or the second form is, for example, a regular or irregular n-gon, where n is greater than or equal to 3. In this case, the connecting lines between the n vertices can be straight or curved. In this case, the n-gon can be planar and so, in other words, lie in a plane. As an alternative, the polygonal form can be arranged on a curved surface. That can mean that the polygonal form is formed by an at least partly curved boundary line which does not lie in a plane.

The optical component described here can be suitable, in particular, for imaging a light source onto an area to be illuminated, such as a screen, for instance, and in this case for homogenizing an inhomogeneous luminous impression of the light source and producing a round light distribution on the area to be illuminated. Round microlenses have previously been used for producing a round illuminated area, but said microlenses cannot be arranged in an area-covering fashion. Therefore, in the case of said round microlenses, regions not covered by the microlenses occur and so-called secondary or ghost images occur as a result of said regions. In order to avoid such ghost images, the regions not covered by the round microlenses have to be light-absorbent, that is to say blackened, which in turn leads to a reduction of the emitted power. This disadvantage can be avoided by means of the optical component described here since, in particular as a result of the polygonal form of the lens elements, in contrast to round microlenses, for example, a complete coverage of the first main surface of the carrier plate by the first lens structure can be possible, in which case two adjacent lens elements, that is to say for example the first and the second lens elements, then always have a partly common boundary line. By way of example, the first polygonal form and the second polygonal form can be in each case an irregular hexagon, which can have a partly common boundary line.

Here and hereinafter, "non-congruent" can mean for the first lens element and the second lens element that the first polygonal form and the second polygonal form are embodied in such a way that, by way of example, the first lens element cannot be oriented by any rotation and translation such that the first and second polygonal forms can be brought to congruence. In this case, the rotation can be defined in particular by an axis of rotation relative to a main extension plane of the first main surface. Thus, the axis of rotation can be the surface normal with respect to the main extension plane of the first main surface. The translation can be defined parallel to the main extension plane of the first main surface. The first polygonal form and the second polygonal form can have, for example, a mutually different number of vertices, different connecting lines between the vertices, different sizes or a combination thereof. Furthermore, the first polygonal form can be axially symmetrical or point-symmetrical with respect to the second polygonal form, in which case the first and second polygonal forms themselves then respectively have no axial or point symmetry.

In addition or as an alternative, "non-congruent" can mean for the first lens element and the second lens element that the first and the second lens elements each have a curved area, which are non-congruent in the above sense. In other words, the curved area of the first lens element cannot be brought to congruence with the curved area of the second lens element by any rotation and translation.

The fact that the first lens element and the second lens element differ in their orientation on the first main surface on the carrier plate can mean, in particular, that the first lens element is arranged in a manner rotated about an axis of rotation and translated relative to the second lens element on the first main surface. By way of example, the first lens element and the second lens element can also be congruent in this case. The axis of rotation can in this case be, in particular, the surface normal with respect to the main extension plane of the first main surface.

If light from a light source radiates through the optical component, then the first and the second lens elements can each project an image of the light source onto a screen, for example. By virtue of the fact that the first lens element and the second lens element are non-congruent and/or do not correspond in terms of their orientation on the first main surface of the carrier plate, the images of the first and second lens elements can be different from one another. It is precisely as a result of this that it can be possible for the image of an inhomogeneously emitting light source that is generated by the optical component to give a more homogeneous luminous impression than would be generated by the light source without the optical component.

The optical component can be suitable, in particular, for being arranged in the beam path of a light source which emits single- or multicolored light, for example. In this case, however, the choice of the light source is not restrictive for the optical component. Here and hereinafter, "light" can denote, in particular, electromagnetic radiation having one or more wavelengths from an ultraviolet to infrared spectral range, in particular from a visible spectral range.

Furthermore, the first main surface or the second main surface can face the light source and the first or second lens structure can thus correspondingly be a radiation entrance area of the optical component. The other of the first main surface and the second main surface can face away from the light source and the other of the first and second lens structures can thus be a radiation exit area of the optical component.

The light source can have, for example, an arrangement of a plurality of light-emitting elements which, for example, can each give an observer different luminous impressions, such that the light source itself without the optical component has an inhomogeneous luminance distribution and/or an inhomogeneous color distribution. The optical component can be suitable for superimposing the different luminous impressions of the plurality of light-emitting elements such that an observer can be given a homogeneous luminous impression. That can be possible by virtue of the fact that the light which is emitted by the light source, that is to say, in particular, the light which is emitted by each of the plurality of light-emitting elements, is imaged by means of the first lens structure. In particular, the light from the light source can be imaged by means of the first lens element and by means of the second lens element downstream of the first lens structure, wherein the image of the light from the light source through the first lens element and the image of the light from the light source through the second lens element can be imaged downstream of the first lens structure in a superimposed fashion. By virtue of the fact that the first form and the second form are non-congruent and/or differ in terms of their orientation on the first main surface of the carrier plate, it can be possible, as described above, that the respective images of the first and second lens elements are not identical and, consequently, as a result of a superimposition of the images, a mixing thereof can occur. As a result of the mixing of the images, the inhomogeneous luminous impression of the light source can be reduced or avoided. It is thus possible, for example, to achieve a round light distribution on a screen downstream of the optical component, even though the individual lens elements each have a polygonal form. In the case of previously known lens arrays having round lenses, although it was possible to achieve round luminance distributions, the luminance distributions, as explained further above, nevertheless also had secondary or ghost images which had to be prevented by the blackening of the regions not covered by the round lenses. In contrast thereto, previously known lens arrays having angular lenses of identical type and with identical orientation were unable to make possible round luminance distributions, but rather in the sharply delimited luminance distributions having forms that had the forms of the lenses.

In particular, the mixing effect of the first lens structure can be increased by the first lens structure having a multiplicity of lens elements, wherein each of the multiplicity of lens elements has a polygonal form. Thereby, the lens elements of the multiplicity of lens elements of the first lens structure can at least in part respectively in pairs be non-congruent and/or differ in terms of their orientation on the first main surface of the carrier plate. In particular, the first lens structure can be embodied in such a way that all the lens elements of the multiplicity of lens elements of the first lens structure in pairs are non-congruent and/or differ in terms of their orientation on the first main surface of the carrier plate.

Thereby, respectively adjacent lens elements can have a partly common boundary line of the respective polygonal form, such that the multiplicity of lens elements of the first lens structure, and thus the first lens structure itself, can completely cover the first main surface. As described above, each of the multiplicity of lens elements can generate an image of a light source on a screen, for example. By virtue of the fact the multiplicity of lens elements differ from one another and are indeed not arranged regularly and in the same manner on the first main surface, a multiplicity of mutually superimposed different images of the light source can be generated on the screen, which can result in a round and homogeneous luminance distribution on the screen.

Furthermore, the optical component can have a second lens structure on the second main surface. Features regarding the first lens structure which have been described hereinbefore and are described hereinafter can apply individually or jointly to the second lens structure as well.

In particular, the second lens structure can be mirror-inverted with respect to the first lens structure on the first main surface. That can mean that the second lens structure is congruent with a mirror image of the first lens structure. In other words, this means that the first lens structure and the second lens structure are symmetrical with respect to one another, with a plane of symmetry parallel to the main extension plane of the first and/or second main surface. Accordingly, the second lens structure can have at least a first and a second lens element having a mirror-inverted arrangement with respect to one another on the second main surface in comparison with the at least first and second lens element on the first main surface.

In particular, the carrier plate can be embodied integrally with the first lens structure. That can mean that the first main surface is formed by the surface of the first lens structure and thus by the totality of the areas of the lens elements of the first lens structure. In this case, a lens element can be formed, in particular, as part of a spherical or aspherical convex lens. In other words, that can mean that the carrier plate with the first lens structure on the first main surface is formed by a multiplicity of convex lenses which mutually penetrate one another.

Lens elements which are shaped as part of a spherical lens can in this case enable simple producibility. Lens elements which are shaped as part of an aspherical lens can enable a correction of the spherical aberration that occurs at a high numerical aperture.

The first and the second lens elements can each have a focal length. In particular, it can be advantageous if the first and second lens elements have the same focal length. If the first lens structure has a multiplicity of lens elements, then it can be advantageous if all the lens elements have the same focal length.

Furthermore, the carrier plate with the first lens structure or the carrier plate with the first and second lens structures can have a thickness which is less than or equal to the focal length of the lens elements, in particular of the first and second lens elements. If the thickness of the carrier plate is less than the focal length of the lens elements, it is possible to achieve a defocusing of the respective images of the lens elements on a screen, for example. Such a defocusing makes it possible to achieve an increase in the homogeneity of the luminance distribution on the screen.

The carrier plate and/or the first lens structure and/or the second lens structure can comprise an optical plastic or a polymer, for example polycarbonate (PC), polymethyl methacrylate (PMMA), silicone or epoxide, a glass or a semiconductor material such as, for instance, GaP or SiC or a mixture or combination thereof. The carrier plate and/or the first lens structure and/or the second lens structure can be produced by a molding process such as, for instance, injection molding, transfer molding or compression molding of one of the plastics mentioned. For this purpose, a suitable mold can be provided, by way of example, which has a negative form of the carrier body with the first and/or second lens structure. In this case, for instance, negative forms of the lens elements can be worked into a surface of the mold by means of milling, for example. Furthermore, the carrier plate and/or the first lens structure and/or the second lens structure can be shaped from one of the provided materials described above by means of milling, grinding, etching, for instance by means of so-called reflow etching, or a combination.

In accordance with at least one embodiment, an illumination device comprises a light source, which emits light into a delimited solid angle range during operation, and an optical component in accordance with any of the embodiments mentioned above.

In particular, the light source can have an arrangement comprising light-emitting diodes (LEDs), which, for example, can emit in each case red, green or blue light. A white-colored luminous impression can be produced from a superimposition of the light respectively emitted by the LEDs. By way of example, the light source comprises four LEDs arranged alongside one another in the emission direction, wherein respectively one LED emits radiation in the red spectral range, two LEDs emit radiation in the green spectral range and one LED emits radiation in the blue spectral range ("RGGB-LEDs"). As an alternative, it is also possible to use other combinations of colored LEDs, such as, for instance, one red, one blue and one green emitting LED or, for instance, one blue and one yellow emitting LED. Furthermore, the light source can have LEDs which can emit mixed-colored light, for instance white light. Since the LEDs can be arranged for example alongside one another in the light source, the light source alone gives an observer an inhomogeneous luminous impression in the form of an inhomogeneous luminance distribution and/or an inhomogeneous color distribution, which can be undesirable precisely in the case of illumination applications.

An LED of the light source can have an epitaxially grown semiconductor layer sequence, for example. In this case, the semiconductor layer sequence can be embodied for example on the basis of an inorganic material, for instance of InGaAlN, such as GaN thin-film semiconductor chips, for instance. InGaAlN-based semiconductor chips include, in particular, those in which the epitaxially produced semiconductor layer sequence, which generally has a layer sequence composed of different individual layers, contains at least one individual layer which comprises a material from the III-V compound semiconductor material system $In_xAl_yGa_{1-x-y}N$ where $0 \leq x \leq 1$, $0 \leq y \leq 1$ and $x+y \leq 1$. As an alternative or in addition, the semiconductor layer sequence can also be based on InGaAlP, that is to say that the semiconductor layer sequence has different individual layers, at least one individual layer of which comprises a material from the III-V compound semiconductor material system $In_xAl_yGa_{1-x-y}P$ where $0 \leq x \leq 1$, $0 \leq y \leq 1$ and $x+y \leq 1$. As an alternative or in addition, the semiconductor layer sequence can also comprise other III-V compound semiconductor material systems, for example an AlGaAs-based material, or II-VI compound semiconductor material systems.

The semiconductor layer sequence can have, for the purpose of generating light, by way of example, a conventional pn junction, a double heterostructure, a single quantum well structure (SQW structure) or a multiple quantum well structure (MQW structure). Alongside the active region, the semiconductor layer sequence can comprise further functional layers and functional regions, for instance p- or n-doped charge carrier transport layers, that is to say electron or hole transport layers, p- or n-doped confinement or cladding layers, barrier layers, planarization layers, buffer layers, protective layers and/or electrodes and combinations thereof. Such structures concerning the active region or the further functional layers and regions are known to the person skilled in the art in particular with regard to construction, function and structure and will therefore not be explained in any greater detail at this juncture.

The light source can furthermore have a collimator, which can be disposed downstream of the arrangement comprising the LEDs. The collimator can be suitable for directing the light emitted by the LEDs into the delimited solid angle range and comprise or be for example a lens and/or a concave mirror, for instance a parabolic mirror.

BRIEF DESCRIPTION OF THE DRAWINGS

Further advantages and advantageous embodiments and developments of the invention will become apparent from the embodiments described below in conjunction with FIGS. 1A to 6E.

In the figures.

DETAILED DESCRIPTION OF THE DRAWINGS

In the exemplary embodiments and figures, identical or identically acting constituent parts may be provided with the same reference symbols in each case. The elements illustrated and their size relationships among one another should not be regarded as true to scale, in principle; rather, individual elements, for instance layers, structural parts, components and regions, may be illustrated with exaggerated thickness or size dimensions in order that the illustration can be improved and/or in order to provide a better understanding.

Figure 1A:
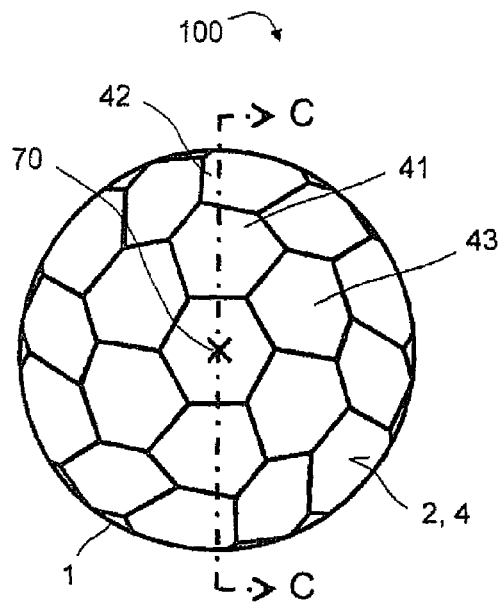
FIGS. 1A to 1C show schematic illustrations of an optical component in accordance with one exemplary embodiment.
Figure 1B:
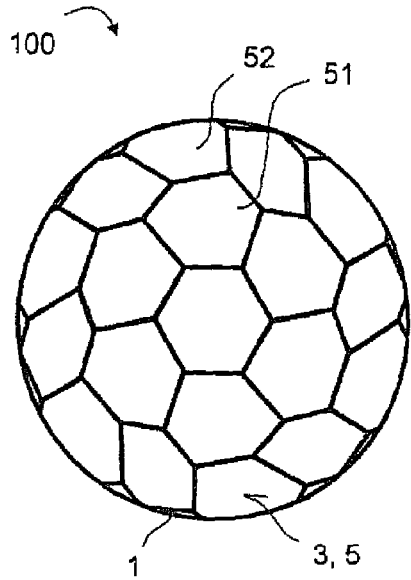
Figure 1C:
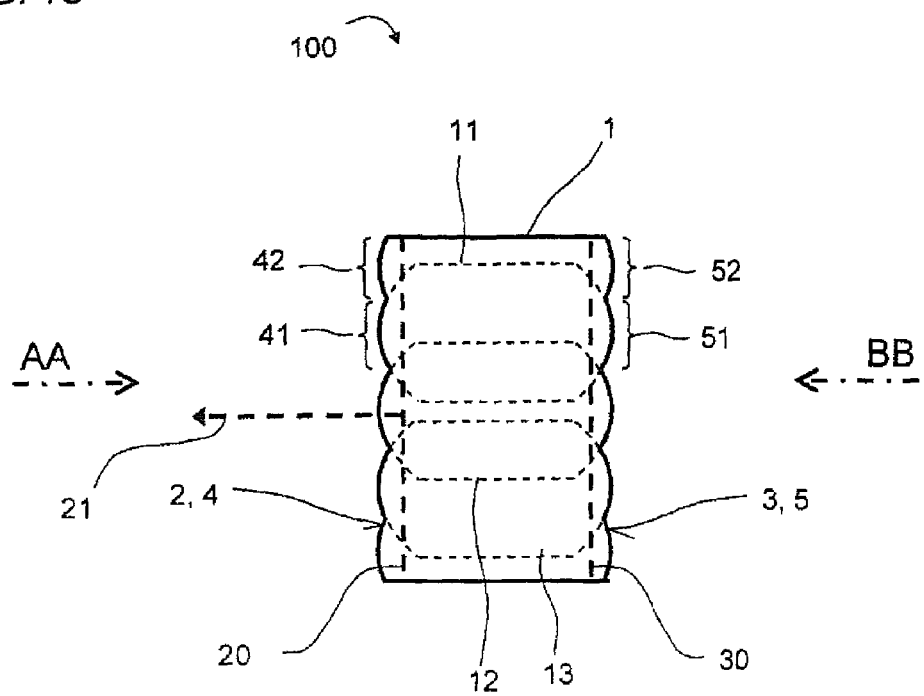

FIGS. 1A to 1C show an exemplary embodiment of an optical component 100. In this case, the illustration in FIG. 1C shows a section through the optical component 100 along the sectional plane CC shown in FIG. 1A. FIG. 1A shows a front view of the optical component from the direction AA identified in FIG. 1C, while FIG. 1B shows a rear view from the direction BB identified in FIG. 1C. The following description relates equally to FIGS. 1A to 1C.

The optical component 100 comprises a carrier plate 1 composed of an optical plastic, said carrier plate having a circular form. As an alternative thereto, the carrier plate 1 can also have a polygonal or elliptical form or a combination thereof. The carrier plate 1 is produced together with the first and second lens structures 4, 5, which are described below, integrally by means of a molding process.

The carrier plate 1 has a first main surface 2 with a first lens structure 4 and a second main surface 3 with a second lens structure 5, said second main surface facing away from the first main surface 2. The first main surface 2 is formed by the first lens structure 4, which completely covers the first main surface 2, while the second main surface is formed by the second lens structure 5, such that the second lens structure 5 completely covers the second main surface 3. The first main surface 2 furthermore has a main extension direction 20, while the second main surface 3 has a main extension direction 30 parallel thereto. The main extension directions 20 and 30 define a surface normal 21 as shown in FIG. 1C.

The first lens structure 4 has a multiplicity of lens elements, of which a first lens element 41, a second lens element 42 and a further lens element 43 are designated by way of example. In this case, the number of lens elements shown is purely by way of example and not restrictive. As an alternative to the exemplary embodiment shown, the carrier plate can for example also have merely the first and the second lens elements 41, 42 as lens structure 4.

The first and the second lens elements 41, 42, like all the further lens elements of the first lens structure 4, have a polygonal form. In particular, the first lens element 41 has a first polygonal form, while the second lens element 42 has a second polygonal form. In this case, the first and the second polygonal forms are non-congruent since, by way of example, the first polygonal form of the first lens element 41 cannot be converted into the second polygonal form by any rotation about an axis of rotation parallel to the surface normal 21 and by any translation. The polygonal form of all the lens elements which do not directly adjoin the edge region of the first main surface 2 is hexagonal in this case. A complete and uninterrupted coverage of the first main surface 2 with the first lens structure 4 is thereby possible.

In contrast thereto, by way of example, the first lens element 41 and the further lens element 43 differ by virtue of their orientation on the first main surface 2 of the carrier plate 1. The first lens element 41 and the further lens element 43 are indeed congruent but arranged in a manner translated and rotated relative to one another about an axis of rotation parallel to the surface normal 21 on the carrier plate 2.

Furthermore, the lens elements of the first lens structure 4 have a vortex structure. That means that the lens elements, with increasing distance from a midpoint 70 of the first main surface, are rotated more and more about an axis of rotation parallel to the surface normal 21. Each lens element of the lens structure 4 is thus rotated relative to the lens elements directly adjacent to it in a radial direction. Alongside the non-congruent shaping of the lens elements, this rotation additionally contributes further to destroying a possible symmetry of the lens elements.

Furthermore, each of the lens elements has an area which it occupies on the main surface 2 and which becomes smaller with increasing distance from the midpoint 70. This gives rise to effects on the emission characteristic of the optical component, which will be explained in greater detail in conjunction with FIG. 3.

Furthermore, the optical component 100 has a second lens structure 5 on the second main surface 3, which is mirror-inverted with respect to the first lens structure 4. That means that the second lens structure has lens elements which are in each case shaped in a mirror-inverted fashion and arranged in a mirror-inverted fashion in comparison with the first lens structure, as is known purely by way of example on the basis of the first lens element 51 and the second lens element 52 of the second lens structure 5, which correspond to the first and second lens elements 41, 42, respectively, of the first lens structure 4.

The optical component 100 is suitable for producing, in conjunction with a light source, a homogeneous luminance distribution having a circular form in the far field. If, as an alternative to the exemplary embodiment shown, by way of example, the lens elements all have elongate, polygonal, non-congruent forms oriented parallel to one another, then it is also possible to produce a homogeneous luminance distribution having an elliptical form in the far field.

As an alternative to the arrangement of the lens elements that is shown in FIGS. 1A to 1C, said lens elements can also all be in pairs different from one another, that is to say non-congruent.

As can be seen from FIG. 1C, each lens element on each of the two main surfaces 2 and 3 of the carrier body 1 has a curved surface. In the exemplary embodiment shown, furthermore, all the lens elements have surfaces having the same curvature and hence the same focal length. In the exemplary embodiment shown, the lens elements in this case correspond to parts of biconvex lens, wherein the underlying imaginary biconvex lenses 11, 12, 13 are indicated by way of example by the dashed lines in the carrier body 1 in FIG. 1C. The carrier body 1 and the first and second lens structures 4, 5 can therefore be understood as overlapping lens.

Depending on the embodiment of the imaginary lenses underlying the optical component, primarily the midpoints of the lens elements can also deviate from a regular arrangement on the first and respectively second main surface 2, 3. In particular a randomly distributed, statistical distribution of the midpoints of the lens elements can furthermore contribute to the above-described homogeneous emission characteristic and luminance distribution in the far field of the optical component 100.

As an alternative to the exemplary embodiment shown, the carrier plate 1 can also be formed by overlapping planoconvex lenses 11, 12, 13. That means that the carrier plate 1 in this case has a second main surface 3 embodied in planar fashion, such that no second lens structure 5 is directly discernable on the second main surface 3. As an alternative thereto, the lens elements of the first and/or second lens structure 4, 5 can also be embodied in spherically or aspherically concave fashion.

Figure 2A:
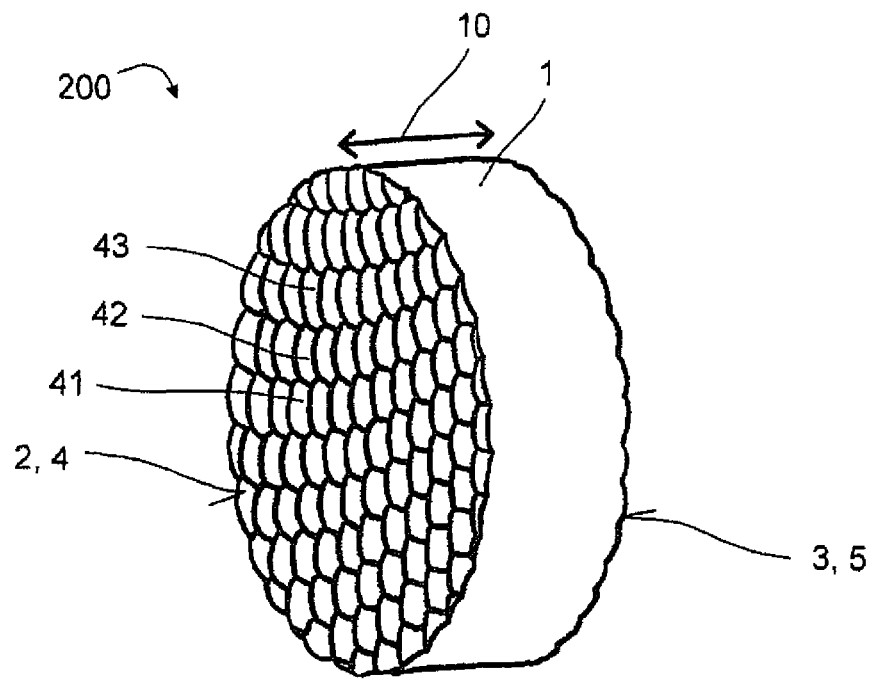
FIGS. 2A and 2B show schematic illustrations of an optical component in accordance with a further exemplary embodiment.
Figure 2B:
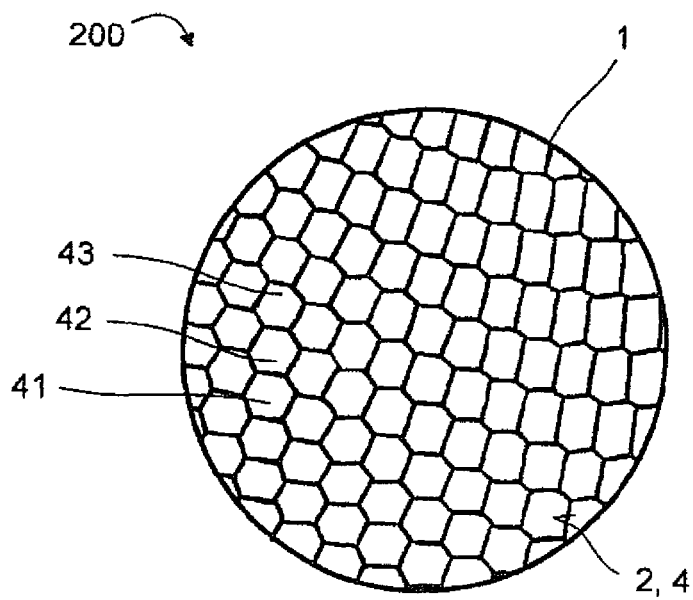

FIGS. 2A and 2B show a further exemplary embodiment of an optical component 200. FIGS. 2A and 2B here in each case show only an excerpt from the optical component 200, wherein FIG. 2A shows a three-dimensional excerpt from the carrier body 1 and FIG. 2B shows a plan view of an excerpt from the first main surface 2 with the first lens structure 4.

As in the previous exemplary embodiment, the optical component 200 has a carrier body 1 with a first lens structure 4 on the first main surface 2 and a second lens structure 5—embodied in a manner mirror-inverted with respect thereto—on the second main surface 3. The first and second lens structures 4, 5 each have a multiplicity of lens elements, of which the lens elements 41, 42 and 43 of the first lens structure are designated by way of example. The lens elements all have a polygonal form in the form of non-congruent hexagons which are directly adjacent to one another and adjoin one another. Consequently, the entire first and second main surfaces 2, 3 of the optical component 2, 3 can be covered with lens elements which all contribute to the optical imaging.

As in the previous exemplary embodiment, the lens elements have a vortex structure in the relative arrangement of the lens elements with respect to one another and also a reduction of the respective area of the lens elements proportionally to the distance from the midpoint (not shown) of the first main surface 2 of the carrier plate 1.

The optical component 200 can have for example a circular form having a diameter of greater than or equal to 1 cm and less than or equal to tens of cm. Depending on the desired focusing or defocusing properties, the thickness 10 of the carrier plate 1 can be greater than or equal to 100 μm and less than or equal to a few mm. By way of example, a carrier body having a diameter of approximately 10 cm and a thickness of approximately 2 mm is advantageous for illumination devices. In this case, the average diameter of a lens element is approximately 1 mm given a focal length of the lens elements of approximately 2 mm, such that the first and respectively second lens structures 4, 5 have in each case approximately 10 000 lens elements.

As an alternative thereto, the thickness 10 of the carrier plate 1 can also be approximately 500 μm, for example, and the lens elements can have a focal length of approximately 500 μm.

Figure 3:
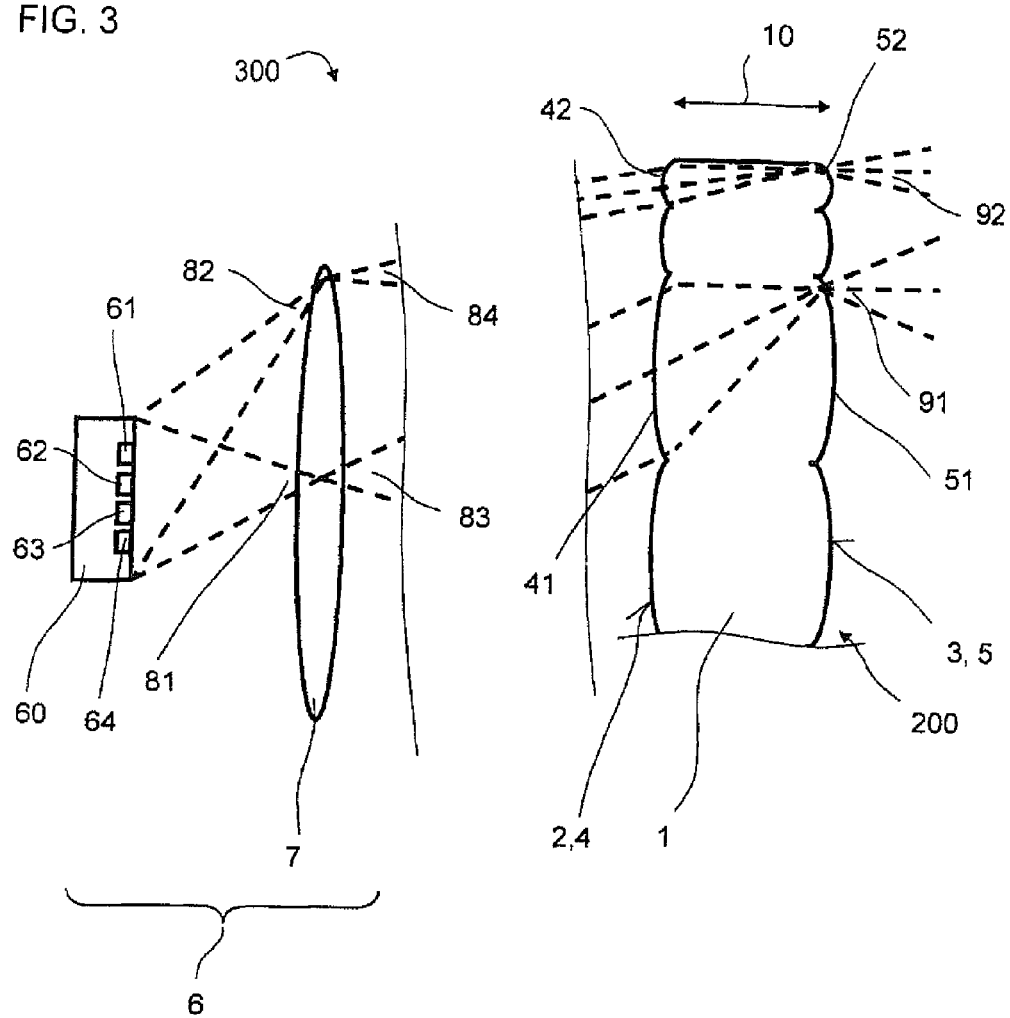
FIG. 3 shows a schematic illustration of an illumination device in accordance with a further exemplary embodiment.

FIG. 3 shows an exemplary embodiment of an illumination device 300. The illumination device 300 comprises a light source 6, which, in the exemplary embodiment shown, has four LEDs 61, 62, 63, 64 on a carrier 60. In this case, during operation, the LED 61 emits red light, the LEDs 62 and 63 emit green light and the LED 64 emits blue light. Since the LEDs 61 to 64 are arranged alongside one another in the emission direction on the carrier 60, the light emitted by the carrier 6 with the LEDs 61 to 64 has an inhomogeneous luminance and color distribution.

The light source 6 furthermore comprises a collimator 7, which is disposed downstream of the LEDs 61 to 64 in the emission direction and which collimates the light emitted by the LEDs 61 to 64 into a delimited solid angle range. Disposed downstream of the collimator 7 is an optical component 200 as shown in the previous exemplary embodiment, only an excerpt from which is shown in FIG. 3. In particular, the light source 6 with the LEDs 61 to 64 and the collimator 7 and the optical component 200 are arranged along a common optical axis (not shown).

In the exemplary embodiment shown, the collimator 7 is embodied as a lens. The latter can be a fresnel lens, for example. However, like the light emitted directly b the carrier 60 with the LEDs 61 to 64, the light emitted by the collimator 7 has an inhomogeneous luminance and color distribution.

As indicated by the dashed lines between the carrier 60 and the collimator 7, the LEDs 61 to 64, as viewed from the collimator 7, appear at a maximum angle 83 in the center of the collimator, while they appear at a minimum angle 82 as viewed from the edge of the collimator 7. On account of etendue conservation in classical imaging systems, the light from the LEDs 61 to 64 is concentrated to a greater extent at the edge of the collimator 7 than in the center of the collimator 7. The light is emitted with a minimum aperture angle 84 at the edge of the collimator, while the light is emitted with a maximum angle 83 in the center of the collimator 7. Such directional emission into a delimited solid angle range can be desirable precisely for illumination applications.

The emission characteristic of the light source 6 can be described by an emission cone with an aperture angle which corresponds, for example, to the aperture angle at which the light intensity emitted along the optical axis has fallen to half. The aperture angle, which thus defines the delimited solid angle range into which the light source emits collimated light, can be set, for example, by the distance between the collimator 7 and the LEDs 61 to 64.

On account of the above-described emission characteristic of the collimator 7 with the outwardly decreasing aperture angles of the light emitted by the collimator 7, it follows for the lens elements of the first and second lens structures 4, 5 of the optical component 200, as described in connection with the previous exemplary embodiment, that the areas of the lens elements which are arranged further away from the midpoint of the carrier plate 1 are embodied such that they are smaller than the areas of the lens elements which are arranged nearer the midpoint of the carrier plate 1.

In this case, the first main surface 2 with the first lens structure 4 forms a radiation entrance area of the optical component 200 for the light emitted by the light source 6, while the second main surface 3 with the second lens structure 5 forms a radiation exit area. As can be seen from FIG. 3, the thickness 10 of the carrier plate 1 and the focal length of the lens elements of the first lens structure 4 can be chosen in such a way that light beams incident on the optical component 200 from the light source 6 are imaged by each lens element of the first lens structure 4 onto the downstream lens element of the second lens structure 5, that is to say onto the radiation exit area.

The emission angles at which the light is furthermore emitted from the radiation exit area, that is to say the lens elements of the second lens structure 5, are similar to the emission angles of the collimator 7, as is shown by the angles 91 and 92, by way of example. On account of the emission characteristic of the light source 6 and the arrangement of the lens elements of the first and second lens structures 4, 5, the light from the lens elements situated further away from the midpoint of the carrier plate 1 is emitted to a greater extent in the forward direction, that is to say with a smaller aperture angle than light from lens elements which are arranged nearer the midpoint of the carrier plate 1.

The optical component 300 shown here is furthermore distinguished by a very good intermixing of the light emitted by the light source 6. The first and second lens structures 4, 5 shown here enable a high spatial resolution of the lens elements, which in turn has the effect that inhomogeneous brightness and/or color distributions on the first lens structure 4 forming the radiation entrance area are imaged by the multiplicity of lens elements on the radiation exit area or second lens structure 5 and are superimposed by the second lens structure 5 in the far field. In this case, the superimposition is composed of all the images of the light source 6 which are produced by each individual lens element on or downstream of the second lens structure 5 forming the radiation exit area.

The invention is not restricted to the exemplary embodiments by the description on the basis of said exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:
1. An optical component, comprising:
a carrier plate having a first main surface and a second main surface facing away from the first main surface;
a first lens structure projecting outwardly from the first main surface; and a second lens structure projecting outwardly from the second main surface, the second lens structure on the second main surface being mirror-inverted with respect to the first lens structure on the first main surface;

wherein the first lens structure has at least a first lens element having a first hexagonal form and a second lens element having a second hexagonal form;

wherein the first lens structure completely covers the first main surface wherein the first and second lens structures comprise lens elements having a three-dimensionally convexly curved surface; and wherein the first lens element and the second lens element are at least one of non-congruent with respect to one another and differ in orientation on the first main surface of the carrier plate.

2. The optical component as claimed in claim 1, wherein the first lens element and the second lens element are arranged in a manner rotated relative to one another on the carrier plate.

3. The optical component as claimed in claim 1, wherein the first polygonal form and the second polygonal form are shaped differently.

4. The optical component as claimed in claim 1, wherein the carrier plate is shaped integrally with the first lens structure.

5. The optical component as claimed in claim 1, wherein the first lens element has a curved area bounded by a boundary line having the first hexagonal form, and wherein the second lens element has a curved area bounded by a boundary line having the second hexagonal form.

6. The optical component as claimed in claim 1, wherein the first lens element and the second lens element have the same focal length.

7. The optical component as claimed in claim 6, wherein the carrier plate has a thickness that is less than the focal length of the first and of the second lens elements.

8. The optical component as claimed in claim 1, wherein the carrier plate comprises a material from a group formed by a plastic, a semiconductor material and glass.

9. The optical component as claimed in claim 1, wherein the first polygonal form and the second polygonal form are in each case a hexagon.

10. The optical component as claimed in claim 1, wherein the first lens structure has a multiplicity of lens elements each having a polygonal form.

11. The optical component as claimed in claim 10, wherein the first main surface has a midpoint, and wherein each of the multiplicity of lens elements occupies an area on the first main surface which becomes smaller with increasing distance from the midpoint.

12. The optical component as claimed in claim 10, wherein each of the multiplicity of lens elements and lens elements directly adjacent thereto are rotated relative to one another.

13. An illumination device, comprising:
a light source, which emits light into a delimited solid angle range during operation; and
an optical component as claimed in claim 1 in the beam path of the light source;
wherein the light source has an arrangement comprising light-emitting diodes and a collimator disposed downstream of the arrangement.

14. The optical component as claimed in claim 1, wherein the lens elements of the first and second lens structures are formed as parts of spherical or aspherical convex lenses.

15. An optical component, comprising:
a carrier plate having a first main surface and a second main surface facing away from the first main surface, each of the first and second main surfaces extending across the carrier plate from a midpoint to a circumference of the carrier plate; and
a first lens structure projecting outwardly from the first main surface;
wherein the first lens structure has at least a first lens element having a first hexagonal form and a second lens element having a second hexagonal form;
wherein the first lens structure completely covers the first main surface;
wherein the first lens element and the second lens elements are at least one of non-congruent with respect to one another and differ in orientation on the first main surface of the carrier plate;
wherein the first lens structure comprises a multiplicity of lens elements that completely cover the first main surface, each of the multiple lens elements having a convexly curved surface and a polygonal form; and
wherein the first main surface has a midpoint, each of the multiplicity of lens elements occupying an area on the first main surface which becomes smaller with increasing distance from the midpoint.

\* \* \* \* \*